(12) United States Patent
Aoki et al.

(10) Patent No.: US 7,320,769 B2
(45) Date of Patent: Jan. 22, 2008

(54) MANUFACTURING METHOD OF FUEL TANK WELDING JOINT

(75) Inventors: Tomohide Aoki, Aichi-ken (JP); Hiroaki Kito, Aichi-ken (JP); Hiroshi Nishi, Aichi-ken (JP); Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 703 days.

(21) Appl. No.: 10/790,030

(22) Filed: Mar. 2, 2004

(65) Prior Publication Data

US 2004/0164463 A1    Aug. 26, 2004

Related U.S. Application Data

(63) Continuation of application No. 10/084,657, filed on Feb. 28, 2002, now abandoned.

(30) Foreign Application Priority Data

Mar. 1, 2001   (JP) .............................. 2001-56806

(51) Int. Cl.
   *B29C 45/14*   (2006.01)
   *B29C 45/16*   (2006.01)
(52) U.S. Cl. .................. 264/250; 264/255; 264/269
(58) Field of Classification Search ..................... None
   See application file for complete search history.

(56) References Cited

U.S. PATENT DOCUMENTS 5,139,043 A * 8/1992 Hyde et al. .................... 137/43
5,443,098 A    8/1995 Kertesz
5,522,417 A * 6/1996 Tomioka et al. ............... 137/43
6,289,915 B1   9/2001 Nulman et al.
6,382,231 B2 * 5/2002 Sugizaki et al. .......... 137/15.26
6,408,867 B2 * 6/2002 Aoki et al. .................. 137/202
6,464,920 B1 * 10/2002 Kramer ....................... 264/243
6,484,741 B2 * 11/2002 Benjey et al. ............ 137/15.26
6,502,607 B2 * 1/2003 Brown et al. .................... 141/1
2001/0047822 A1 * 12/2001 Aoki et al. .................. 137/202
2004/0119200 A1 * 6/2004 Gram .......................... 264/255

FOREIGN PATENT DOCUMENTS

JP    A-2000-8981    1/2000

* cited by examiner

*Primary Examiner*—Edmund H. Lee
(74) *Attorney, Agent, or Firm*—Posz Law Group, PLC

(57) ABSTRACT

A welding joint 10 for a fuel tank reduces the amount of fuel vapor in the fuel tank that escapes into the atmosphere. The fuel tank welding joint 10 a joint main body 20 and a barrier layer laminated on the surface of the joint main body 20. The joint main body 20 is formed of a first resin material weldable to the wall of the fuel tank FT, and the barrier layer 30 is formed of a second resin material that is adhesively and chemically reactive with the first resin material and that is more fuel-impermeable than the first resin material. An end portion 34 formed so as to be exposed to the outside at the end of a tube portion 24 is formed on the barrier layer 30. When the barrier layer 30 is injection molded on the surface of the joint main body 20, the end portion 34 is formed by the flow of the second resin material through the end of the tube portion 24 to increase the adhesive strength of the end face where the parts are joined.

14 Claims, 9 Drawing Sheets

MANUFACTURING METHOD OF FUEL TANK WELDING JOINT

This application is a continuation application of U.S. patent application Ser. No. 10/084,657, now abandoned, which was filed on 28 Feb. 2002 and which claims the benefit of and priority from Japanese Application No. 2001-56806 filed Mar. 1, 2001, the content of which is incorporated herein by reference.

BACKGROUND OF THE INVENTION

1. Field of the Invention

The present invention relates to a welding joint for fuel tanks, which is welded to a tank wall of a fuel tank to provide a connecting passage between the interior of the fuel tank and the outside.

2. Description of the Related Art

A example of a conventional fuel cut-off valve as a fuel tank welding joint is disclosed in JP 2000-8981A. FIG. 13 is a cross sectional view of a fuel cut-off valve 100. In FIG. 13, the fuel cut-off valve 100 comprises a case main body 102 welded to a tank upper wall FTa, a float 112, a spring 114, and a bottom plate 116. A connecting passage 102a is opened and closed by the float 112 according to a level of the fuel in the fuel tank FT. The upper part of the case main body 102 serves as a lid 104, which is welded to the tank top wall FTa at an annular welded edge portion 106 of the lid 104. When the fuel tank FT is fueled, causing the fuel level to rise, fuel vapor in the fuel tank FT flows out of a float chamber through the connecting passage 102a to the outside. When the fuel reaches a predetermined level FL1 in the fuel tank FT, the flotation force of the float 112 in the fuel cut-off valve 100 increases, causing the float 102 to rise and close the connecting passage 102a, so as to prevent the fuel from flowing out of the fuel tank FT.

The tank upper wall FTa is made of polyethylene, and the lid 104 is made of nylon or a polyacetal. The annular welded edge portion 106 is made of a modified olefinic resin containing a polar functional group, and is thus thermally welded at either end to the lid 104 formed of nylon and the tank upper wall FTa formed of polyethylene. Specifically, polyethylene and nylon are not miscible with each other, but they can both be welded by interposing the modified olefinic resin containing a polar functional group.

In the conventional technology, however, the lid 104 is made of polyethylene, and the fuel vapor in the fuel tank FT can thus penetrate through the lid 104, however slightly, to be released into the atmosphere. Such fuel vapor leaks should be minimized in the interests of environmental safety.

SUMMARY OF THE INVENTION

To overcome such drawbacks, an object of the present invention is to provide a fuel cut-off valve permitting less fuel vapor in fuel tanks from being released into the atmosphere.

To solve this problem, an exemplary first embodiment of the present invention provides a fuel tank welding joint for connecting a fuel tank to a prescribed member. The fuel tank welding joint comprising a joint main body including a welded edge portion that is configured to be thermally welded to a wall of the fuel tank and a tube portion for connecting a hose, the tube portion having a connecting passage to connect an interior of the fuel tank and the prescribed member and a barrier layer formed on a surface of the joint main body.

The joint main body is made of a first resin material that is weldable to a wall of the fuel tank, and the barrier layer is made of a second resin material that is adhesively and chemically reactive with the first resin material and that is more fuel-impermeable than the first resin material, the barrier layer having an end portion formed so as to extend past an end of the tube portion.

The fuel tank welding joint of the present invention is thermally welded at the welded edge portion of the joint main body on the wall of the fuel tank. The joint main body is formed of a first resin material that is weldable to the wall of the fuel tank, and is thus easily thermally welded to the welded edge portion. When the hose is connected to the tube portion of the joint main body, it is connected to the interior of the fuel tank through the connecting passage.

A barrier layer is also formed on the surface of the joint main body. The barrier layer is formed of a second resin material that has better fuel impermeability than the first resin material, thus shielding the joint main body from the outside and reducing fuel permeation.

Because the second resin material is also adhesively and chemically reactive with the first resin material, the barrier layer is integrally formed with the joint main body, leaving no gap between it and the joint main body, so as to further prevent fuel vapor in the fuel tank from being released.

The joint main body also has the following structure to improve the adhesive strength at the end face where it is joined to the barrier layer.

Specifically, when the fuel tank welding joint is produced, the joint main body is formed with the first resin material, and the barrier layer is then formed with the second resin material by means of injection molding on the surface of the joint main body. When the barrier layer is injection molded, the second resin material flows through the end of the tube portion of the joint main body and fills the end portion-forming cavity to form the end portion. At that time, the end face where the end portion and the end of the tube portion are joined does not serve as the end for the flow of the second resin material, which fuses at a high temperature, thus affording a high degree of adhesive strength.

The second resin material flows through the narrow end of the tube portion during the injection molding of the barrier layer, resulting in shearing heat. The shearing heat keeps the second resin material at a high temperature to ensure better adhesion with the first resin material. The barrier layer is thus joined with considerable adhesive force to the end of the tube portion, with little danger of separation from the tube portion.

Thus, when the first resin material has greater fuel expandability than the second resin material, the joint main body is expanded by the fuel in the fuel tank more than the barrier layer, yet will not separate.

In a preferred embodiment of the first invention, the fuel tank is formed of polyethylene, where the first resin material is a modified olefinic resin containing a polar functional group, and the second resin material is a polyamide or polyacetal. The olefinic resin can be welded because it is the same type of resin as polyethylene, and because a polar functional group has been added, it reacts and adheres to polyamides or polyacetals.

The second invention is a method for producing a fuel tank welding joint for connecting a fuel tank to the outside. The fuel tank welding joint comprises a first step of forming a joint main body with a first resin material and a second step of feeding a second resin material into a mold cavity in which the joint main body has been set, so as to form a barrier layer. The second step comprises the step of allowing the second resin material to flow through the end of the tube portion into the cavity to form the end portion.

In a preferred embodiment of the second invention, the mold unit comprises a split mold comprising a first mold and second mold. The joint main body comprises a burr cutting edge upstream from the welded edge portion in the route through which the resin material passes, the burr cutting edge being pressed to the second mold by the clamping pressure from the first mold to define the cavity.

When the joint main body is set in the first and second molds and is clamped, the burr cutting edge of the joint main body is pressed into the second mold by the clamping pressure of the first mold to define the cavity. Because the burr cutting edge is formed upstream in the route through which the resin flows to the welded edge portion, the cavity is defined in order to prevent the resin from flowing to the welded edge portion. Accordingly, no second resin material that is not welded to the fuel tank reaches the vicinity of the welded edge portion, thus ensuring that the fuel tank welding joint is always welded to the fuel tank at the welded edge portion.

Because the burr cutting edge is directly subject to the clamping force between the first and second molds, dimensional imperfections resulting from resin contraction and the like during the manufacture of the joint main body are absorbed so as to prevent gaps from being created at the end of the cavity, thus ensuring that resins leaks will be prevented.

DESCRIPTION OF THE PREFERRED EMBODIMENTS

Figure 1:
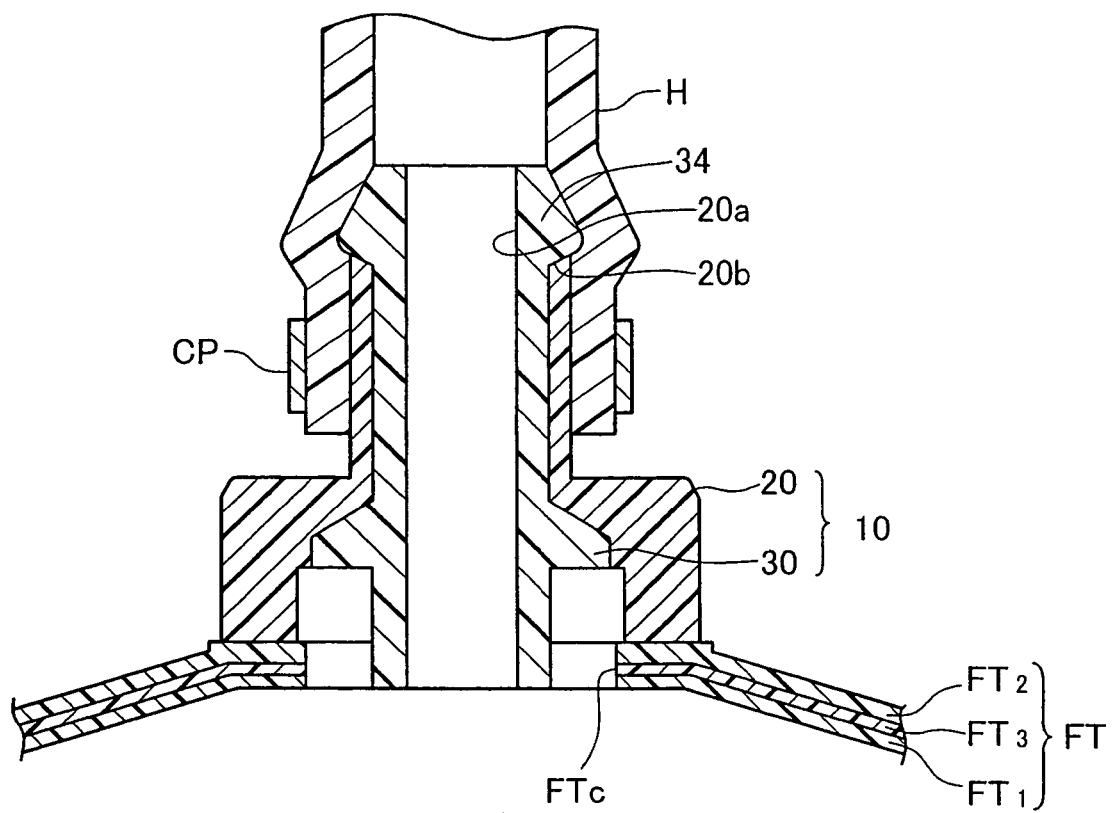
FIG. 1 is a cross sectional view illustrating a fuel tank welding joint attached to the top of an automobile fuel tank in a first embodiment of the present invention.

FIG. 1 is a cross sectional view illustrating a fuel tank welding joint 10 attached to an upper wall of an automobile fuel tank FT in a first embodiment of the present invention. In FIG. 1, the fuel tank FT is formed by blow molding in three layers using composite resin material, with polyethylene. Specifically, the fuel tank FT comprises the lamination of a tank inner layer FT1, a tank outer layer FT2, and a barrier layer FT3 interposed between the tank inner layer FT1 and tank outer layer FT2. The tank inner layer FT1 and tank outer layer FT2 are formed of a high density polyethylene, and primarily function as structural components to ensure the mechanical strength of the fuel tank. Meanwhile, the barrier layer FT3 is formed of ethylene vinyl alcohol (EVOH) or a polyamide (PA) characterized by exceptional fuel vapor impermeability, and functions as a blocker to prevent fuel vapor from penetrating through.

The fuel tank welding joint 10 is a joint that covers the attachment port FTc of the fuel tank FT and connects to a hose H, and comprises a joint main body 20 and a barrier layer 30 laminated to a surface of the joint main body 20.

Figure 2:
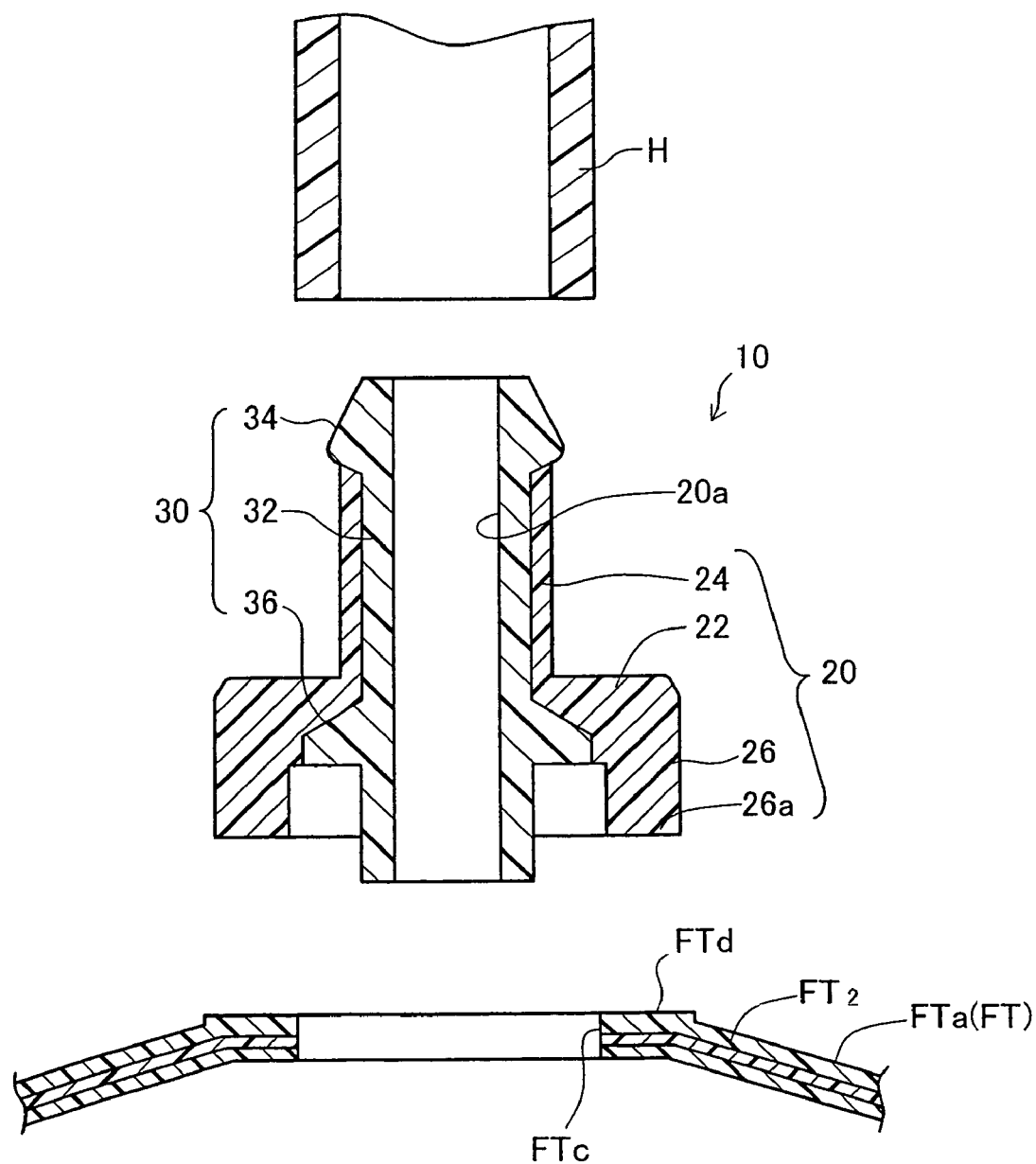
FIG. 2 is a cross sectional view illustrating the fuel tank welding joint before it is welded to the fuel tank.

FIG. 2 is a cross sectional view of the fuel tank welding joint 10 before the fuel tank welding joint 10 is welded to the fuel tank FT. In FIG. 2, the joint main body 20 comprises a stop plate 22, a flange 26 formed around the circumference of the stop plate 22 and a tube portion 24 for attaching the hose, the tube portion 24 having a connecting passage 20a connecting the interior of the fuel tank FT with the outside. Formed on a bottom end of the flange 26 is an annular welded edge portion 26a that is welded to the tank upper wall FTa of the fuel tank FT.

The barrier layer 30 covers a wide area on the surface of the joint main body 20 with a resin material having exceptional fuel vapor impermeability so as to reduce penetration by fuel vapor. The barrier layer 30 comprises the inner tube layer 32 formed along the connecting passage 20a of the joint main body 20, the end portion 34 formed so as to be externally exposed at the end of the tube portion 24 and the umbrella-shaped portion 36 formed on the inner wall of the flange 26, which are integrally formed.

The end portion 34 is formed by the flow of the resin through the end of the tube portion 24 when the barrier layer 30 is injection molded on the surface of the joint main body 20. The step for the injection molding of the barrier layer 30 is described below.

The resin materials for forming the joint main body 20 and barrier layer 30 should be determined in consideration of the weldability with the fuel tank FT, the fuel vapor impermeability, the adhesion between the joint main body 20 and barrier layer 30, and so forth.

Specifically, the resin for the joint main body 20 is determined in consideration primarily of the thermal weldability to the fuel tank FT. When the tank outer layer FT2 of the fuel tank FT is made of polyethylene, a modified olefinic resin (first resin material) containing a polar functional group is used for the joint main body 20.

The resin for the barrier layer 30 is determined in consideration primarily of the fuel vapor impermeability. A polyamide or polyacetal (second resin material) is used for the barrier layer 30.

Since the first resin material forming the joint main body 20 is an olefinic resin, the first resin material can be welded to the similar polyethylene forming the tank outer layer FT2, and since the first resin material contains a polar functional group, the first resin material reacts and adheres to the polyamide or polyacetal forming the barrier layer 30.

The welding of the fuel tank welding joint 10 to the tank upper wall FTa of the fuel tank FT is described below. In FIG. 2, the bottom end of the welded edge portion 26a of the fuel tank welding joint 10 is fused by means of a hot plate (not shown in figure), and the area around the attachment port FTc of the fuel tank FT is fused by a hot plate (not shown), resulting in a welded portion FTd. The welded edge portion 26a is pressed to the welded portion FTd. As a result, the welded edge portion 26a and the welded portion FTd are both formed of an olefinic resin material, and are thus welded together when cooled to solidification.

While these part are in this state, as illustrated in FIG. 1, the hose H is fitted to the tube portion 24 of the joint main body 20 and clamped with a clamp CP, and the hose is thus connected to the interior of the fuel tank FT by way of the connecting passage 20a. At that time, the end face 20b joining the end of the tube portion 24 of the joint main body 20 to the end portion of the barrier layer 30 will be covered by the inside of the hose H to provide a seal against the outside.

The barrier layer 30 is formed of the second resin material which is more fuel vapor impermeable than the first resin material, thus shielding the joint main body 20 from the outside to reduce the amount of fuel permeation. Since the second resin material is also adhesively and chemically reactive with the first resin material, the barrier layer 30 is integrally formed with the joint main body 20, leaving no gaps between the barrier layer 30 and the joint main body 20, so as to further prevent the fuel vapor inside the fuel tank from escaping into the atmosphere.

A method for producing the fuel tank welding joint 10 is described below. The fuel tank welding joint 10 is formed by what is referred to as two-color molding. Two-color molding is a method in which the joint main body 20 and barrier layer 30 are integrally formed upon the separate injection molding of two types of resins.

Figure 3:
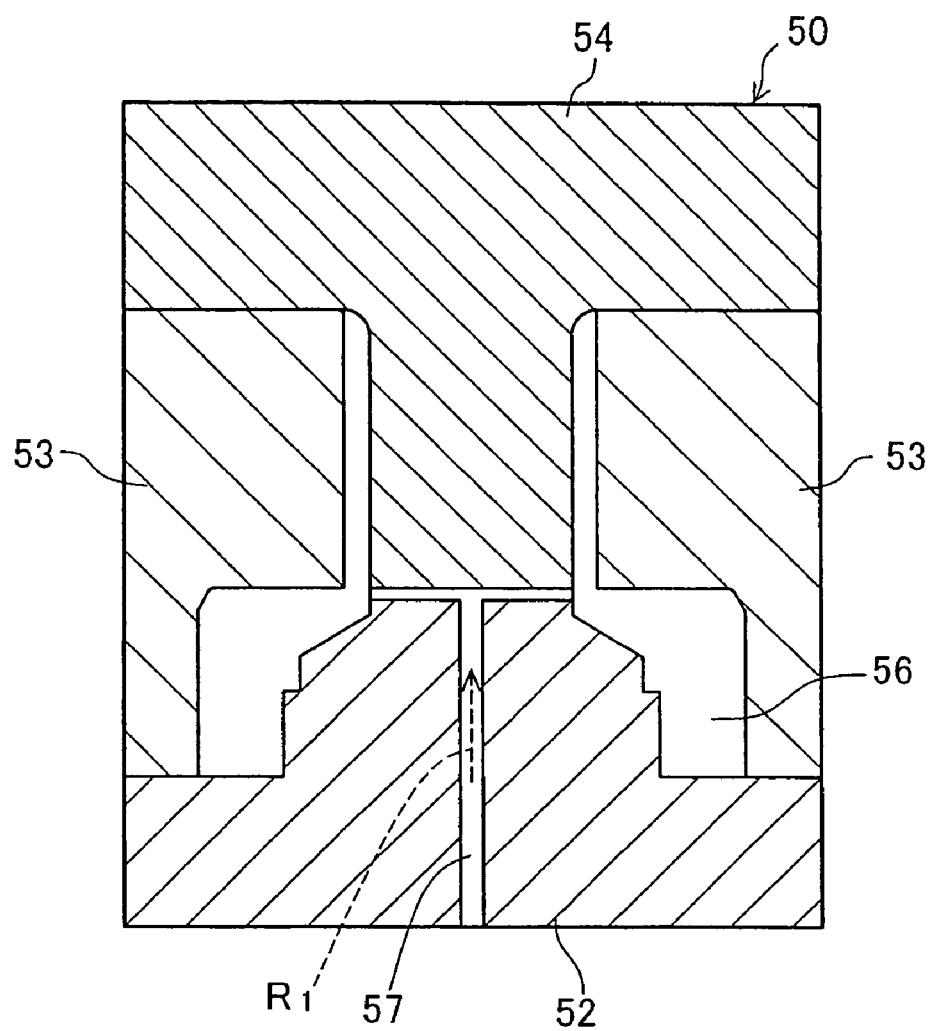
FIG. 3 illustrates a mold used in the injection molding step.
Figure 4:
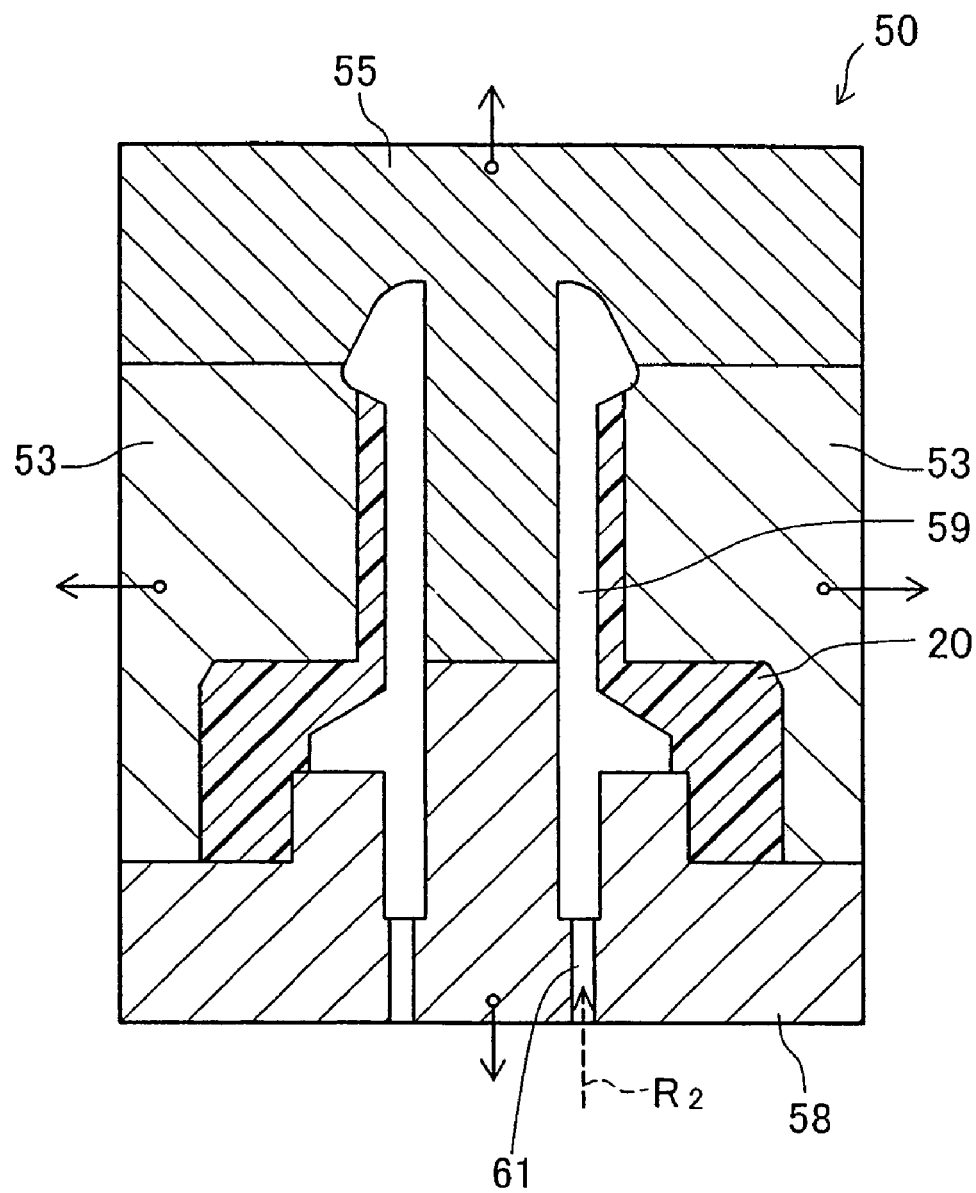
FIG. 4 illustrates a mold used in the step subsequent to FIG. 3.

FIGS. 3 and 4 illustrate the molds which are used in two stages during the steps for producing the fuel tank welding joint. In this step, two molds 50 are changed over in sequence, and the first resin material and second resin material are injected from different injection molding machines.

In FIG. 3, the mold 50 comprises a first mold 52, second mold 53, and third mold 54, where a first cavity 56 is formed while surrounded by the first mold 52, second mold 53, and third mold 54. A gate 57 connected to the injection molding machine is formed in the first cavity 56. While the mold 50 is clamped, the first resin material is injected through the gate 57 to form the joint main body 20 (see FIG. 1). The first mold 52 and third mold 54 are then opened relative to the second mold 53.

Then, as shown in FIG. 4, the joint main body 20 formed in the first step is clamped by the fourth mold 55 and fifth mold 58 while mounted in the second mold 53. The fourth mold 55 and fifth mold 58 form a second cavity 59 with the joint main body 20. Specifically, the shape of the second cavity 59 conforms to the barrier layer 30 (FIG. 1). A gate 61 connected to the injection molding machine is connected to the second cavity 59. The molds are opened in the direction indicated by the arrows in the figure to take out the final product.

Figure 5:
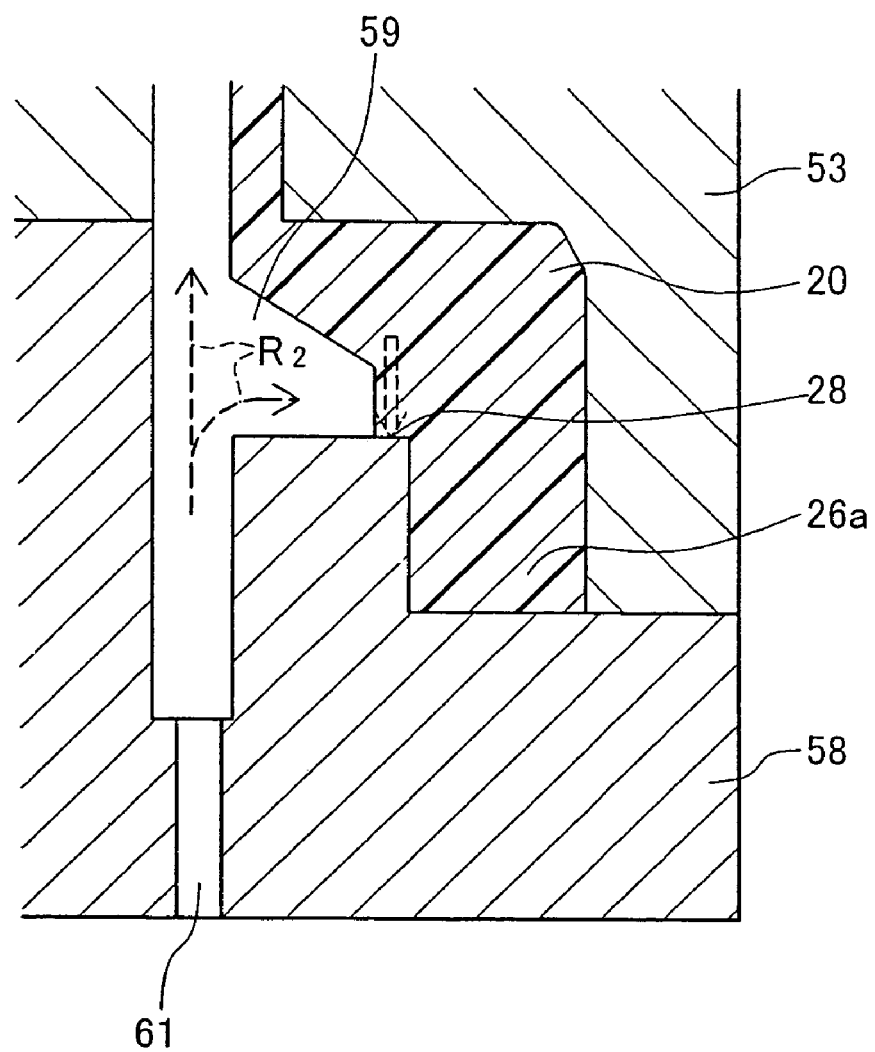
FIG. 5 illustrates the flow of resin in the injection molding step.

FIG. 5 is a detail of the area around the bottom of the second cavity 59 in FIG. 4. In FIG. 5, the burr cutting edge 28 is formed in stages upstream from the welded edge portion 26a of the joint main body 20 while the fourth mold 55 and fifth mold 58 are clamped to the second mold 53. The burr cutting edge 28 is pressed to the fifth mold 58 by the clamping pressure from the second mold 53, defining the second cavity 59.

Figure 6:
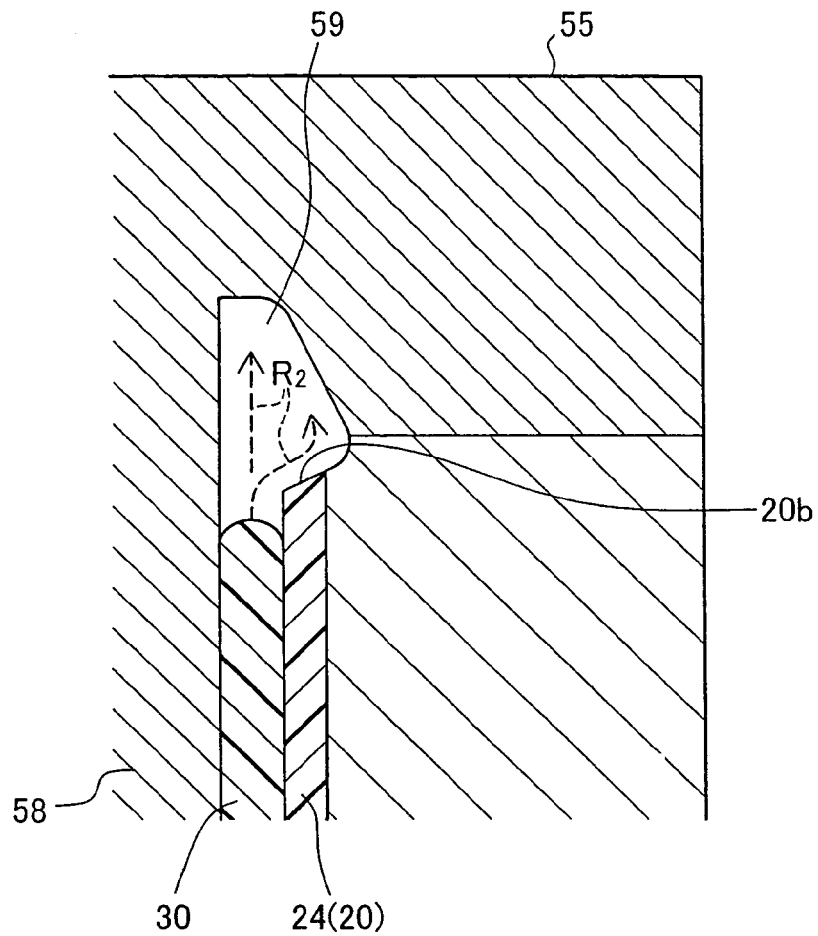
FIG. 6 illustrates the flow of resin in the injection molding step.

When the second resin material R2 is injection molded through the gate 61 while the mold is thus clamped, the second cavity 59 is filled. At that time, as shown in FIG. 6, the second resin material R2 flows through the end of the tube portion 24 of the joint main body 20, and fills the cavity to form the end portion 34. The end face 20b where the end portion 34 and the end of the tube portion 24 are joined does not dispose in the end for the flow of the second resin material R2, and the second resin material R2 is welded at a high temperature to the joint main body 20, thus affording a high degree of adhesive strength.

The second resin material R2 flows through the narrow end of the tube portion 24 during the injection molding of the barrier layer 30, resulting in shearing heat. The shearing heat keeps the second resin material R2 at a high temperature, melting the surface of the joint main body 20 to ensure better adhesion with the first resin material. The injection temperature of the second resin material R2 is 250 to 300° C., which is higher than the injection temperature of 200 to 230° C. of the first resin material. The resin thus flows to subsequent steps at a high temperature, ensuring better adhesive chemical reaction.

The barrier layer 30 is thus joined with considerable adhesive force to the end face 20b disposed to the end of the tube portion 24, with little danger of separation from the tube portion 24.

The first resin material thus has greater fuel expandability than the second resin material, and the joint main body 20 is expanded by the fuel in the fuel tank more than the barrier layer 30, yet will not separate from the barrier layer 30.

As shown in FIG. 5, the joint main body 20 is provided with a burr cutting edge 28, resulting in the following action. Specifically, when the mold is clamped with the joint main body 20 set up in the second mold 53 and fifth mold 58, the burr cutting edge 28 of the joint main body 20 is pressed to the fifth mold 58 by the clamping force of the second mold 53, thus defining the second cavity 59. Because the burr cutting edge 28 is formed upstream in the route through which the second resin material R2 flows to the welded edge portion 26a, the second cavity 59 is defined to prevent the resin from flowing to the welded edge portion 26a. As such, no second resin material R2 that is not welded to the fuel tank FT reaches the area around the welded edge portion 26a, thus ensuring that the fuel tank welding joint 10 is welded to the wall of the fuel tank at the welded edge portion 26a.

Furthermore, since the burr cutting edge 28 is directly subject to the clamping force between the second mold 53 and fifth mold 58, dimensional imperfections resulting from resin contraction during the manufacture of the joint main body 20 are absorbed to prevent gaps from being created at the end of the second cavity 59, thus ensuring that resins leaks will be prevented.

Figure 7:
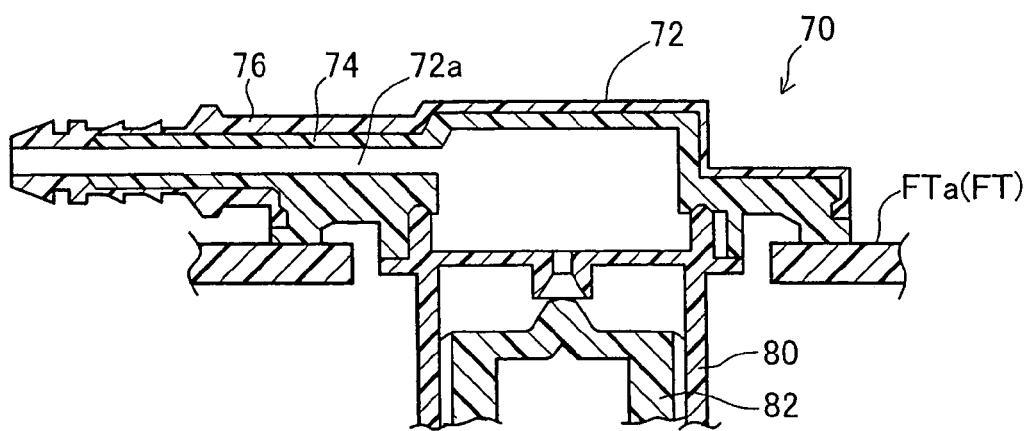
FIG. 7 is a cross sectional view illustrating the top of a fuel cut-off valve in a second embodiment.
Figure 8:
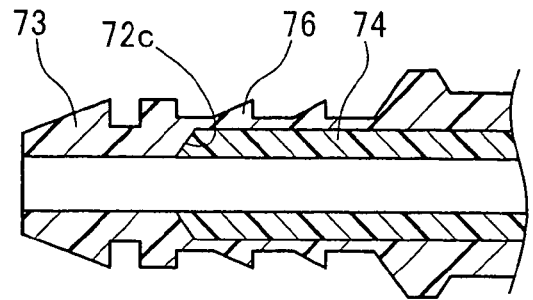
FIG. 8 is a detail cross sectional view of the vicinity of the end of the lid (welding joint) in FIG. 7.

FIG. 7 is a cross sectional view of the top of a fuel cut-off valve 70 in a second embodiment. The second embodiment is characterized by a structure in which the fuel tank welding joint is used for a fuel cut-off valve 70. In FIG. 7, the fuel cut-off valve 70 comprises a lid 72 forming the welding joint mounted on the tank upper wall FTa, a case main body 80, a float 82, a spring, and a bottom plate, where a connecting passage 72a is opened and closed by the float 82 according to the level of fuel in the fuel tank FT. The lid 72 comprises a lid main body 74 (joint main body) and a barrier layer 76, which are laminated. The barrier layer 76 is formed along the outer wall of the lid main body 74. As illustrated in FIG. 8, the second resin material flows through the end of the lid main body 74 to form the end portion 73 during the injection molding of the barrier layer 76, thus improving the adhesive strength at the end face 72c where the parts are joined.

Figure 9:
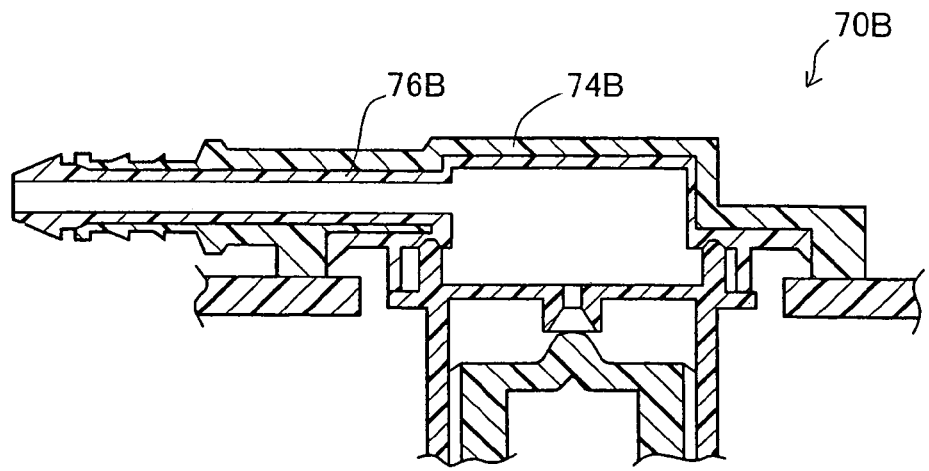
FIG. 9 shows a cross sectional view as a modification of the second embodiment.
Figure 10:
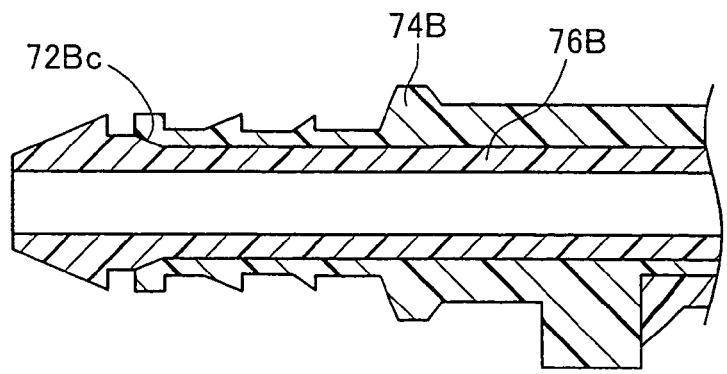
FIG. 10 is a detail cross sectional view of the vicinity of the end of the lid (welding joint) in FIG. 9.

As shown in FIG. 9, which illustrates another modification of a fuel cut-off valve, a barrier layer 76B may be formed on the inner surface of a lid main body 74B forming a fuel cut-off valve 70B. This modification, as illustrated in FIG. 10, can improve the adhesive strength at an end face 72Bc to which the lid main body 74B is joined, during the formation of the barrier layer 76B.

Figure 11:
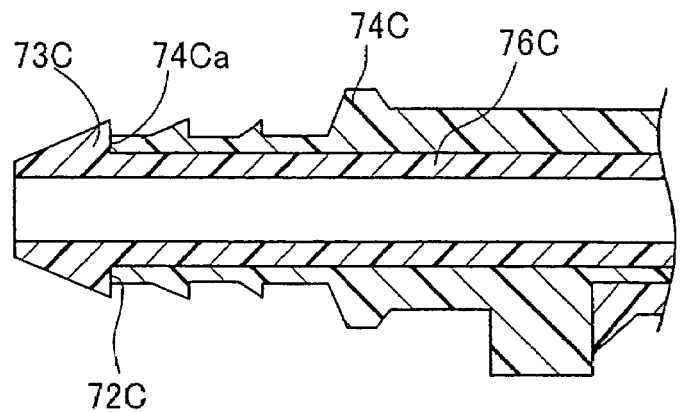
FIG. 11 is a cross sectional view illustrating another modification of FIG. 10.

Furthermore, as illustrated in the modification in FIG. 11, when a leading end face 74Ca of a lid main body 74C is covered by an end portion 73C extending out from a barrier layer 76C, the adhesive strength of the joining welded face 72Cc can be even further improved, making this a preferred option.

The present invention is not limited to the above embodiments. Various embodiments can be worked within the scope of the invention. Examples are given below.

Figure 12:
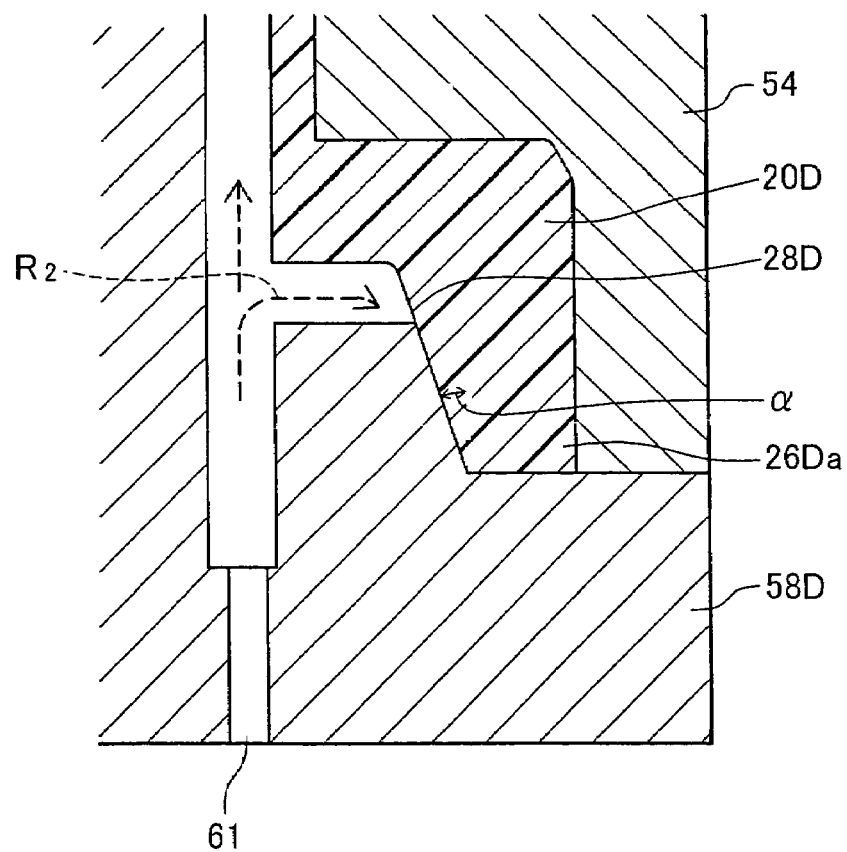
FIG. 12 illustrates a modification of the burr cutting edge in another embodiment.
Figure 13:
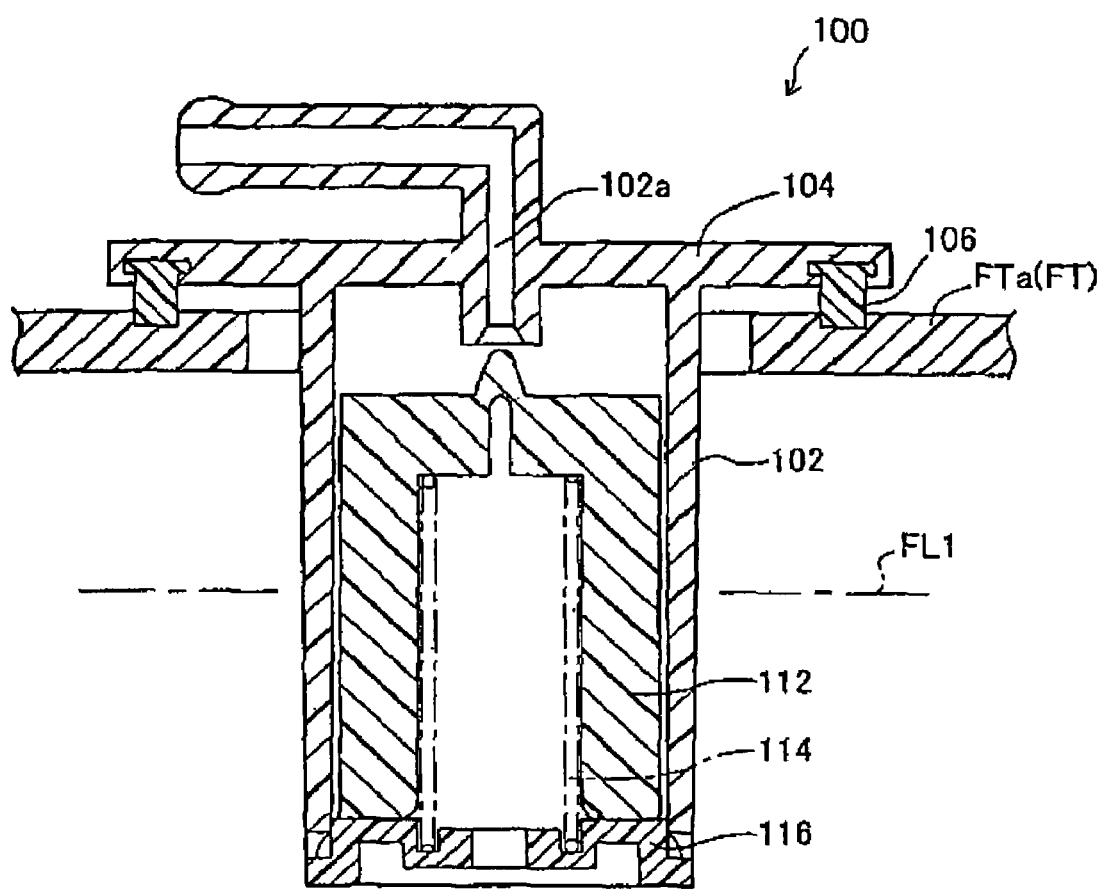
FIG. 13 is a cross sectional view of a conventional fuel cut-off valve.

(1) In the embodiment illustrated in FIG. 5, the burr cutting edge 28 is formed as a step, resulting in a shape which presses at right angles onto the flat surface of the fifth mold 58, but this is not the only option, and the part may be in the form of a tapered surface as illustrated in FIG. 12. That is, a burr cutting edge 28D has a tapered form with an angle $\alpha°$ (10°) or more, so that the flow of the second resin material R2 to the welded edge portion 26Da side is cut off by the clamping pressure in the upward diagonal direction of the fifth mold 58D, eliminating burs.

(2) Various types of joints may be used, provided that the fuel tank is connected to the outside. For example, joints to inlet pipes for supplying fuel can be used.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A method for manufacturing a fuel tank welding joint for connecting a fuel tank to a prescribed member, the method comprising:
    forming a joint main body made of a first resin material configured to be welded to a wall of the fuel tank, the joint main body including (i) a welded edge portion to be thermally welded to the wall of the fuel tank and (ii) a tube portion for connecting a hose, the tube portion having a connecting passage to connect an interior of the fuel tank and the prescribed member; and
    forming a barrier layer by injecting a second resin material into a cavity of a mold unit in which the joint main body has been set, the second resin material being adhesively and chemically reactive with the first resin material and more fuel-impermeable than the first resin material,
    wherein forming the barrier layer includes (i) allowing the second resin material to flow through an end of the tube portion into the cavity, so as to form an end portion, and (ii) allowing the second resin material to flow toward the welded edge portion, so as to form a lower end of the barrier layer with a gap from the welded edge portion, and
    the first resin material includes a modified olefinic resin containing a polar functional group and the second resin material is selected from the group of polyamide and polyacetal, and an injection temperature of the second resin material is higher than that of the first resin material.

2. The method for manufacturing a fuel tank welding joint according to claim 1, wherein the barrier layer is formed on a surface of the joint main body along the connecting passage.

3. The method for manufacturing a fuel tank welding joint according to claim 2, wherein the end portion includes a hose catch for holding the hose, the hose catch having a greater diameter than an outer circumference of the end of the tube portion.

4. The method for manufacturing a fuel tank welding joint according to claim 3, wherein the barrier layer includes an umbrella-shaped portion configured to engage with the joint main body.

5. The method for manufacturing a fuel tank welding joint according to claim 1, wherein the mold unit includes a split mold including a first mold and second mold; and the joint main body comprises a burr cutting edge, the burr cutting edge being disposed upstream from the welded edge portion in a route through which the second resin material passes, the burr cutting edge being pressed to a part of the second mold by the a clamping pressure from the first mold, thereby defining the cavity.

6. A method for manufacturing a fuel cut-off valve opening and closing a connecting passage, connecting a fuel tank to a prescribed member, according to a level of fuel in the fuel tank, the method comprising:
    forming a lid made of a first resin material that is configured to be thermally welded to a wall of the fuel tank, the lid including (i) a lid main body with the connecting passage, (ii) a welded edge portion to be thermally weldable to a wall of the fuel tank and (iii) a barrier layer formed on a surface of the lid main body;
    forming a barrier layer by injecting a second resin material into a cavity of a mold unit in which the lid main body has been set, the second resin material being adhesively and chemically reactive with the first resin material and more fuel-impermeable than the first resin material,
    wherein forming the barrier layer includes (i) allowing the second resin material to flow through an end of the lid main body into the cavity, so as to form an end portion, and (ii) allowing the second resin material to flow toward the welded edge portion, so as to form a lower end of the barrier layer with a gap from the welded edge portion, and
    the first resin material includes a modified olefinic resin containing a polar functional group and the second resin material is selected from the group of polyamide and polyacetal, and an injection temperature of the second resin material is higher than that of the first resin material.

7. The method for manufacturing a fuel cut-off valve according to claim 6, wherein the barrier layer is formed on a surface of the lid main body along the connecting passage.

8. The method for manufacturing a fuel cut-off valve according to claim 7, wherein the end portion includes a hose catch for holding the hose, the hose catch having a greater diameter than an outer circumference of the end of a tube portion of the lid main body.

9. The method for manufacturing a fuel cut-off valve according to claim 7, wherein the barrier layer includes an umbrella-shaped portion configured to engage with the lid main body.

10. The method for manufacturing a fuel cut-off valve according to claim 6, wherein the mold unit includes a split mold including a first mold and second mold; and the lid main body comprises a burr cutting edge, the burr cutting being disposed upstream from the welded end in a route through which the resin material passes, the burr cutting edge being pressed to a part of, the second mold by the clamping pressure from the first mold, thereby defining the cavity to form the end portion.

11. The method for manufacturing a fuel tank welding joint according to claim 1, wherein:

the forming a joint main body includes forming a lid including the joint main body, the method further comprises (i) forming a case main body mounted on the lid, the case main body having a valve chamber connecting to the connecting passage, and (ii) forming a float accommodated in the valve chamber, the float rising and falling according to a level of fuel in the fuel tank, and the lid, the case main body, and the float form a fuel cut-off valve opening and closing the connecting passage according to a level of fuel in the fuel tank.

12. The method for manufacturing a fuel tank welding joint according to claim 11, wherein the barrier layer is formed on a surface of the lid main body along the connecting passage.

13. The method for manufacturing a fuel tank welding joint according to claim 12, wherein the end portion includes a hose catch for holding the hose, the hose catch having a greater diameter than an outer circumference of the end of a tube portion of the lid main body.

14. The method for manufacturing a fuel tank welding joint according to claim 13, wherein the barrier layer includes an umbrella-shaped portion configured to engage with the lid main body.

* * * * *